United States Patent
Guo et al.

(10) Patent No.: US 12,425,750 B2
(45) Date of Patent: Sep. 23, 2025

(54) PIXEL COLLECTION CIRCUIT AND IMAGE SENSOR

(71) Applicant: OmniVision Sensor Solution (Shanghai) Co., Ltd, Shanghai (CN)

(72) Inventors: Menghan Guo, Shanghai (CN); Shoushun Chen, Shanghai (CN)

(73) Assignee: OmniVision Sensor Solution (Shanghai) Co., Ltd, Shanghai (CN)

( * ) Notice: Subject to any disclaimer, the term of this patent is extended or adjusted under 35 U.S.C. 154(b) by 117 days.

(21) Appl. No.: 18/530,363

(22) Filed: Dec. 6, 2023

(65) Prior Publication Data

US 2024/0107189 A1    Mar. 28, 2024

Related U.S. Application Data

(63) Continuation of application No. PCT/CN2021/100606, filed on Jun. 17, 2021.

(30) Foreign Application Priority Data

Jun. 7, 2021   (CN) .......................... 202110631843.1

(51) Int. Cl.
H04N 25/47   (2023.01)
H04N 25/78   (2023.01)

(52) U.S. Cl.
CPC ............. *H04N 25/47* (2023.01); *H04N 25/78* (2023.01)

(58) Field of Classification Search
None
See application file for complete search history.

(56) References Cited

U.S. PATENT DOCUMENTS 9,521,337 B1 *   12/2016   Shen ...................... H04N 25/77

* cited by examiner

*Primary Examiner* — Mark T Monk
(74) *Attorney, Agent, or Firm* — IPro, PLLC; Na Xu (57) ABSTRACT

The present disclosure discloses a pixel collection circuit and an image sensor. Where the image sensor includes: a pixel collection circuit array containing a plurality of pixel collection circuits; a global control unit, coupled with the pixel collection circuit array through a global reset signal line and suitable for resetting the pixel collection circuit array when the image sensor is powered on; a global time signal generation unit, coupled with the pixel collection circuit array through a global time signal line and suitable for generating a global time signal that represents time information; and a reading unit, coupled with the pixel collection circuit array through a row selection line, a row event reset signal line, a column flag bit signal line and a column time signal line and suitable for reading event information of an event sequence generated by the pixel collection circuit array.

16 Claims, 8 Drawing Sheets

PIXEL COLLECTION CIRCUIT AND IMAGE SENSOR

TECHNICAL FIELD

The present disclosure relates to the technical field of image sensors, and in particular to a novel image sensor.

BACKGROUND

Detection of moving objects plays an important role in various application fields of image sensors. In the application field, a dynamic vision image sensor (hereinafter, referred to as a dynamic vision sensor) has attracted more and more attention because of its unique advantages compared with a traditional image sensor (for instance, an active pixel sensor).

For a pixel unit (or a pixel collection circuit) designed according to a bionic principle, the dynamic vision sensor can continuously respond to a light intensity change in a field of view in real time without any exposure time. In this way, a high-speed moving object can be detected more easily. In addition, due to the fact that the dynamic vision sensor only responds to and outputs the position information of the pixel unit corresponding to an area having the light intensity change in the field of view, and automatically shields useless background information, it also has the advantages of small output data volume and low bandwidth occupation. With the above-mentioned characteristics of the dynamic vision sensor, an image processing system at a back end can directly obtain and process useful dynamic information in the field of view. Therefore, its requirements for storage and computing power are greatly reduced, and better real-time performance can be achieved.

In the general dynamic vision sensor, a pixel unit generates an event after detecting that the light intensity change meets a preset condition. Before the event is read by a peripheral control unit, the pixel unit remains in a reset state and no longer responds to the external light intensity change. After the event is read, the reset state of the pixel unit is released, and the pixel unit responds to the external light intensity change again. The time from when the event is generated in the pixel unit until the event is read by the peripheral control unit is called reading delay of the event. During the reading delay, because the pixel unit no longer responds to the external light intensity change, this will cause the dynamic vision sensor to lose some event information that should have been detected. This situation becomes more severe with the acceleration of the moving speed of objects in the field of view and the limited event processing and reading speed of the dynamic vision sensor. For some high-speed motion detection, the moving speed of the objects is very high, which is reflected in a rapid light intensity change in the field of view. The presence of reading delay causes the pixel unit to be unable to respond to the rapid change, thus missing the output of some events. On the other hand, due to the increasing resolution of the dynamic vision sensor, the transmission delay of internal wiring in chips is also increasing, which fundamentally limits the event processing and reading speed of the dynamic vision sensor, thereby increasing the reading delay of events. As a result, the event information output by the dynamic vision sensor is unable to accurately restore real motion information, especially for high-speed motion.

Based on the above description, a novel image sensor is urgently required to solve the above-mentioned problems.

SUMMARY

The present disclosure provides a novel pixel collection circuit and image sensor, so as to solve or at least alleviate at least one of the above-mentioned problems.

According to one aspect of the present disclosure, there is provided a pixel collection circuit, including: an event generation module suitable for generating a trigger signal that represents event generation when an intensity change of light illuminated on the event generation module meets a certain condition; a state latch suitable for being set when the trigger signal is received; a self-timing logic coupled to the state latch and suitable for being activated when the state latch is set and resetting the state latch after a predetermined period of time in the activated state so as to enable the event generation module to respond to an external light intensity change again; an event sequence storage module coupled to the state latch and suitable for storing event information of an event sequence composed of a plurality of generated events when the state latch is set; and a reading module coupled to the event sequence storage module and suitable for reading the event information of the event sequence stored in the event sequence storage module when a row selection line is valid.

Optionally, in the pixel collection circuit according to the present disclosure, the event information includes state information and time information of the generated event, and the event sequence storage module includes: an event register group containing a plurality of event registers suitable for storing state information of an event generated by the pixel collection circuit; and a time sampling group containing a plurality of sampling sub-modules, where the sampling sub-modules are in one-to-one correspondence with the event registers, and the sampling sub-modules are suitable for recording the time information of the event pointed to by the corresponding event registers.

Optionally, in the pixel collection circuit according to the present disclosure, the reading module is coupled with a peripheral reading unit through the row selection line, a plurality of column flag bit signal lines and a plurality of column time information signal lines; and the reading module is also suitable for outputting the state information of each event through the plurality of column flag bit signal lines and outputting the time information of each event through the plurality of column time information signal lines when the row selection line is valid.

Optionally, in the pixel collection circuit according to the present disclosure, the reading module is coupled with the peripheral reading unit through the row selection line, a reading gating signal line, a column flag bit signal line and a column time information signal line; and the reading module is also suitable for outputting the state information of each event through the column flag bit signal lines and outputting the time information of each event through the column time information signal lines under the action of the reading gating signal line when the row selection line is valid.

Optionally, in the pixel collection circuit according to the present disclosure, the sampling sub-module is coupled with a peripheral global time signal generation unit through a global time signal line, suitable for sampling instantaneous amplitude of a global time signal at the time of event generation as the time information of the event.

Optionally, in the pixel collection circuit according to the present disclosure, the event register group includes: N event registers connected in series, where N≥2, the input end of the first event register is connected to the power supply voltage, and the input ends of the 2nd to Nth event registers are connected to the output ends of the previous event registers, where the clock signal of each event register is the output of the state latch, and all the event registers are connected to a row event reset signal line to be reset when receiving a row event reset signal.

Optionally, in the pixel collection circuit according to the present disclosure, the sampling sub-module includes: a first switch, whose control end is connected to the output end of the corresponding event register, first end is connected to the global time signal line, and second end is connected to the first end of a first capacitor; and the first capacitor whose second end is grounded.

Optionally, in the pixel collection circuit according to the present disclosure, the event register is also suitable for indicating the state information of the corresponding event through the output signal of the event register, where when the event register is reset, the output signal of the event register is low level, and when the event register is set, the output signal of the event register is high level; and the sampling sub-module is also suitable for sampling the instantaneous amplitude of the global time signal through the first capacitor when the first switch is off as the time information of the corresponding event when the event register is set.

Optionally, in the pixel collection circuit according to the present disclosure, the sampling sub-module includes: a pulse shaper; a second switch, whose control end of is connected to the output end of the corresponding event register through the pulse shaper, first end is connected to the global time signal line, and second end is respectively connected to the drain of a first transistor and the first end of a second capacitor; and the first transistor and the second capacitor connected in parallel, where the source of the first transistor and the second end of the capacitor are grounded, and the grid of the first transistor is connected to the row event reset signal line.

Optionally, in the pixel collection circuit according to the present disclosure, the sampling sub-module is also suitable for outputting a narrow pulse signal to the second switch through the pulse shaper during event generation in order to turn off the second switch. The instantaneous amplitude of the global time signal is sampled by the second capacitor to serve as the time information of the event.

Optionally, in the pixel collection circuit according to the present disclosure, the reading module includes: a plurality of buffer sub-modules each of which composed of a second transistor and a third switch connected in series, and each buffer sub-module outputs state information or time information of an event correspondingly; where the source of the second transistor is connected to one end of the third switch, the grid of the second transistor is connected to the output end of the event sequence storage module, the drain of the second transistor is connected to the power supply, the control end of the third switch is connected to the row selection line, and the other end of the third switch is connected to the column flag bit signal line or the column time information signal line.

Optionally, in the pixel collection circuit according to the present disclosure, the reading module includes: a plurality of buffer sub-modules each of which composed of a third transistor and a fourth switch connected in series, the source of the third transistor is connected to one end of the fourth switch, the grid of the third transistor is connected to the output end of the event sequence storage module, the drain of the third transistor is connected to the power supply, the control end of the fourth switch is connected to the reading gating signal line, and the other end of the fourth switch is connected to one end of a fifth switch or a sixth switch; the fifth switch, one end of which is connected to the other ends of one part of the fourth switches, and the other end is connected to the column flag bit signal line; and the sixth switch, one end of which is connected to the other ends of the other part of the fourth switches, and the other end is connected to the column time information signal line.

Optionally, in the pixel collection circuit according to the present disclosure, the event generation module includes: a photoelectric detection sub-module suitable for monitoring an optical signal emitted to the photoelectric detection module in real time and outputting a corresponding electrical signal; and a trigger generation sub-module coupled to the photoelectric detection sub-module and suitable for generating a trigger signal that represents event generation when the electrical signal meets a threshold condition.

According to another aspect of the present disclosure, there is provided an image sensor, including: a pixel collection circuit array containing a plurality of pixel collection circuits as mentioned above; a global control unit, coupled with the pixel collection circuit array through a global reset signal line and suitable for resetting the pixel collection circuit array when the image sensor is powered on; a global time signal generation unit, coupled with the pixel collection circuit array through a global time signal line and suitable for generating the global time signal that represents time information; and a reading unit, coupled with the pixel collection circuit array through a row selection line, a row event reset signal line, a column flag bit signal line and a column time signal line and suitable for reading event information of an event sequence generated by the pixel collection circuit array.

Optionally, in the image sensor according to the present disclosure, the reading unit includes: a row selection sub-unit coupled with the pixel collection circuit array through the row selection line and the row event reset signal line; a column selection sub-unit coupled with the pixel collection circuit array through the column flag bit signal line and the column time signal line; and a reading control sub-unit suitable for controlling the row selection sub-unit and the column selection sub-unit.

Optionally, in the image sensor according to the present disclosure, the event information includes state information and time information of the event, and the column selection sub-unit includes: a column flag bit reading sub-unit suitable for reading the state information of the event through the column flag bit signal line; and a column time information reading sub-unit suitable for reading the time information of the event through the column time signal line.

According to the pixel collection circuit of the present disclosure, a self-timing logic is used instead of a handshake protocol control logic in the general dynamic vision sensor. After the pixel collection circuit enters a trigger state, the self-timing logic is activated and automatically releases the trigger state of the pixel collection circuit after the timing ends, and the pixel collection circuit may immediately respond to an external light intensity change. In this way, the operation of the pixel collection circuit no longer relies on a peripheral reading control logic, and may continuously detect and generate events.

In addition, an event sequence storage module is further added to the pixel collection circuit to temporarily store state information and time information of a plurality of events generated by the pixel collection circuit. When the pixel collection circuit is selected by a peripheral reading unit, event sequence information temporarily stored in the pixel collection circuit is read to an external unit.

An image sensor based on this pixel collection circuit is not supposed to miss event detection due to reading delay. Moreover, due to insensitivity to reading delay, the working speed of the reading unit on the periphery of the pixel collection circuit array may also be correspondingly reduced, thereby reducing the power consumption of the image sensor.

BRIEF DESCRIPTION OF DRAWINGS

To achieve the above-mentioned and related objectives, some illustrative aspects are described herein in connection with the following description and the accompanying drawings, which indicate various ways of implementing the principles disclosed herein, and all aspects and their equivalents are intended to fall within the scope of the claimed subject matter. The above-mentioned and other objectives, features and advantages of the present disclosure will become clearer with reference to the following detailed description in conjunction with the accompanying drawings. Throughout the present disclosure, like reference numerals generally refer to like components or elements.

DETAILED DESCRIPTION OF THE EMBODIMENTS

Illustrative examples of the present disclosure will be described in more detail below with reference to the accompanying drawings. Although the illustrative examples of the present disclosure are shown in the accompanying drawings, it should be understood that the present disclosure may be implemented in various forms and should not be limited to the examples illustrated herein. Rather, these examples are provided such that the present disclosure can be understood more thoroughly and the scope of the present disclosure can be fully conveyed to those skilled in the art.

Figure 1:
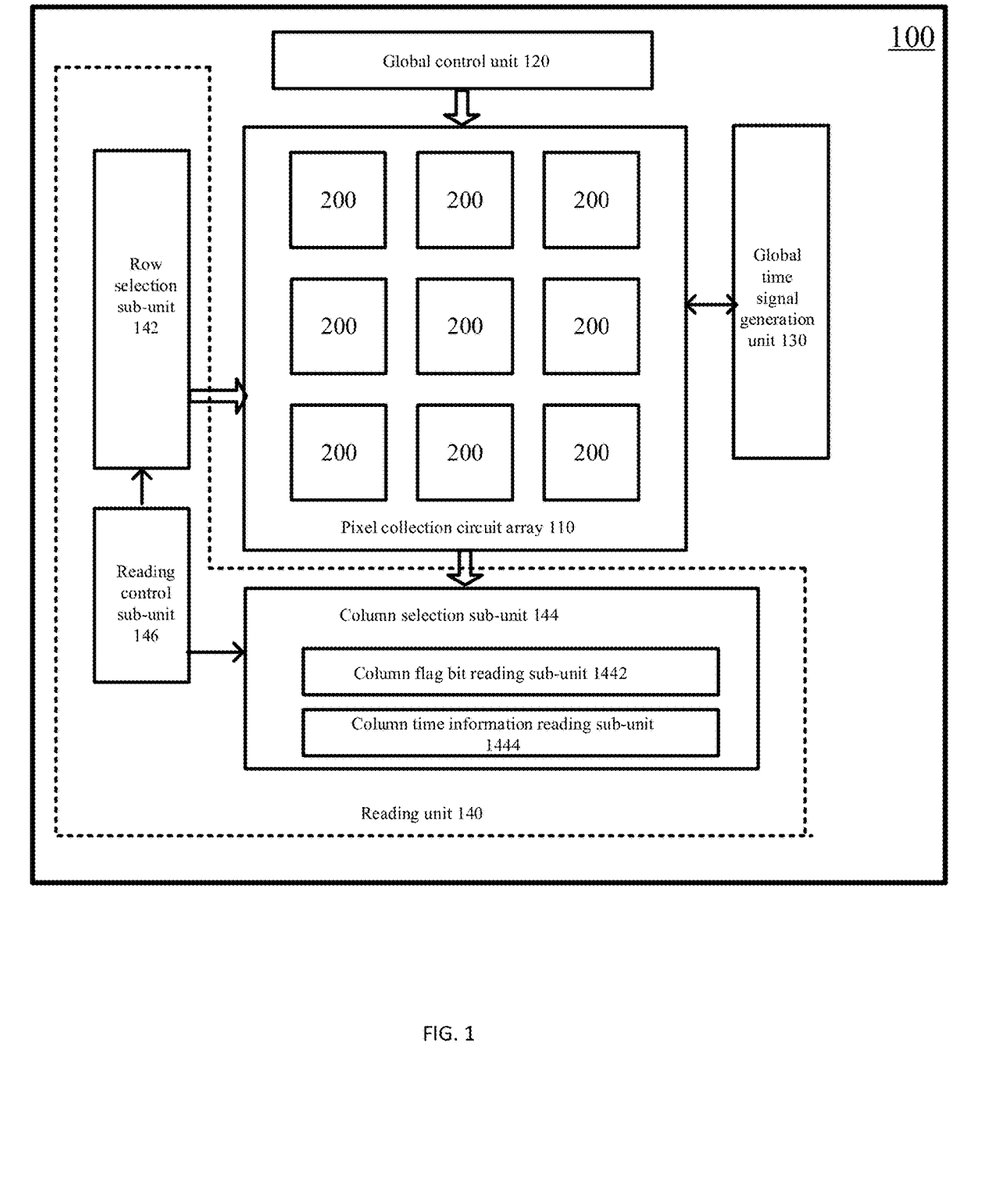
FIG. 1 shows a schematic diagram of an image sensor 100 according to some examples of the present disclosure.

FIG. 1 shows a schematic diagram of an image sensor 100 according to some examples of the present disclosure.

As shown in FIG. 1, the image sensor 100 includes: a pixel collection circuit array 110, a global control unit 120, a global time signal generation unit 130 and a reading unit 140.

Where the pixel collection circuit array 110 is composed of a plurality of identical pixel collection circuits 200 (i.e., pixel units) arranged in two dimensions in space (FIG. 1 shows a 3×3 pixel collection circuit array, which does not limit the pixel collection circuit array).

According to an embodiment of the present disclosure, the pixel collection circuit 200 monitors a light intensity change in a field of view in real time and enters a trigger state when the light intensity change meets a certain condition, that is, an event is generated upon trigger to indicate a motion event occurring at a corresponding position in the field of view at the moment. According to the pixel collection circuit 200 of the present disclosure, event information of a plurality of events may be stored in the pixel collection circuit, where the event information includes state information and time information of the generated events.

Moreover, the reading unit 140 further includes a row selection sub-unit 142, a column selection sub-unit 144 and a reading control sub-unit 146. The column selection sub-unit 144 further includes a column flag bit reading sub-unit 1442 and a column time information reading sub-unit 1444. The reading control sub-unit 146 is coupled with the row selection sub-unit 142 and the column selection sub-unit 144 respectively to control the row selection sub-unit 142 and the column selection sub-unit 144 respectively.

As shown in FIG. 1, the pixel collection circuit array 110 is coupled with the global control unit 120, the global time signal generation unit 130 and the reading unit 140 respectively. Specifically speaking, the global control unit 120 is coupled with the pixel collection circuit array 110 through a global reset signal line. The global time signal generation unit 130 is coupled with the pixel collection circuit array 110 through a global time signal line. The reading unit 140 is coupled with the pixel collection circuit array 110 through a row selection line, a row event reset signal line, a column flag bit signal line and a column time signal line. Furthermore, the row selection sub-unit 142 is coupled with the pixel collection circuit array 110 through the row selection line and the row event reset signal line, and the column selection sub-unit 144 is coupled with the pixel collection circuit array 110 through the column flag bit signal line and the column time signal line (specifically, the column flag bit reading sub-unit 1442 is coupled with the pixel collection circuit array 110 through the column flag bit signal line, and the column time information reading sub-unit 1444 is coupled with the pixel collection circuit array 110 through the column time signal line).

In an example, the global control unit 120 resets the entire pixel collection circuit array 110 when the image sensor 100 is powered on, such that each pixel collection circuit 200 is ensured to have a stable initial state.

The global time signal generation unit 130 generates a global time signal that represents time information. The global time signal may be a periodically changed analog voltage signal, such as a ramp signal, triangular wave signal or exponential signal that changes over time, or it may be an encoded periodic digital signal, such as a multi-bit Gray Code signal. The example of the present disclosure has no limit on this. According to an example of the present disclosure, the pixel collection circuit 200 samples instantaneous amplitude information of the global time signal at the time it is triggered as the time information of the event.

The global time signal generation unit 130 may be implemented as a ramp signal generator, triangular wave signal generator or exponential signal generator, etc. Some of the circuit modules mentioned above are universal basic modules, so they will not be repeated here.

The reading unit 140 reads the event information generated by the pixel collection circuit array 110. Unlike general dynamic vision sensors, the reading unit 140 is only used to read the event information stored in the pixel collection circuit array 110, and is not used to control the working state of the pixel collection circuit array 110.

According to an example of the present disclosure, the row selection sub-unit 142 and the column flag bit reading sub-unit 1442 may be random scanning deciders or sequential scanning selective scanning circuits, which will not be repeated here.

According to an embodiment, when the global time signal line provides a periodically changed analog voltage signal, corresponding to each column of pixel collection circuits, the column time information reading sub-unit 1444 includes one or more analog-to-digital converters for converting the time information of events stored in the pixel collection circuits 200 (i.e., the instantaneous voltage amplitude of the global time signal) into digits for encoded output, and a back-end processing unit may recover the true time information of event generation based on this. When the global time signal line provides an encoded multi-bit periodic digital signal, the column time information reading sub-unit 1444 is implemented as a multi-bit digital scanning circuit.

In an example, the reading control sub-unit 146 first controls the row selection sub-unit 142 to select a row of pixel collection circuits 200, then the reading control sub-unit 146 controls the column selection sub-unit 144 to read the state information (for example, "0" indicates not triggered, "1" indicates triggered) and time information stored in the row of pixel collection circuits 200, and outputs the information to an external module of the image sensor 100. The state information, for example, is represented by "0" to indicate not triggered event, and "1" to indicate triggered event.

Unlike the pixel collection circuit in the general dynamic vision sensor, the pixel collection circuit here is not only able to generate and store information of a plurality of event information, its reset operation is completed independently, without relying on peripheral reading control logic. That is to say, the trigger of the pixel collection circuit 200 (i.e., event generation) and the release of the trigger state are both completed inside the pixel collection circuit 200.

To further illustrate the pixel collection circuit 200, the internal structure and working principle of the pixel collection circuit 200 will be elaborated in the following illustrations.

Figure 2:
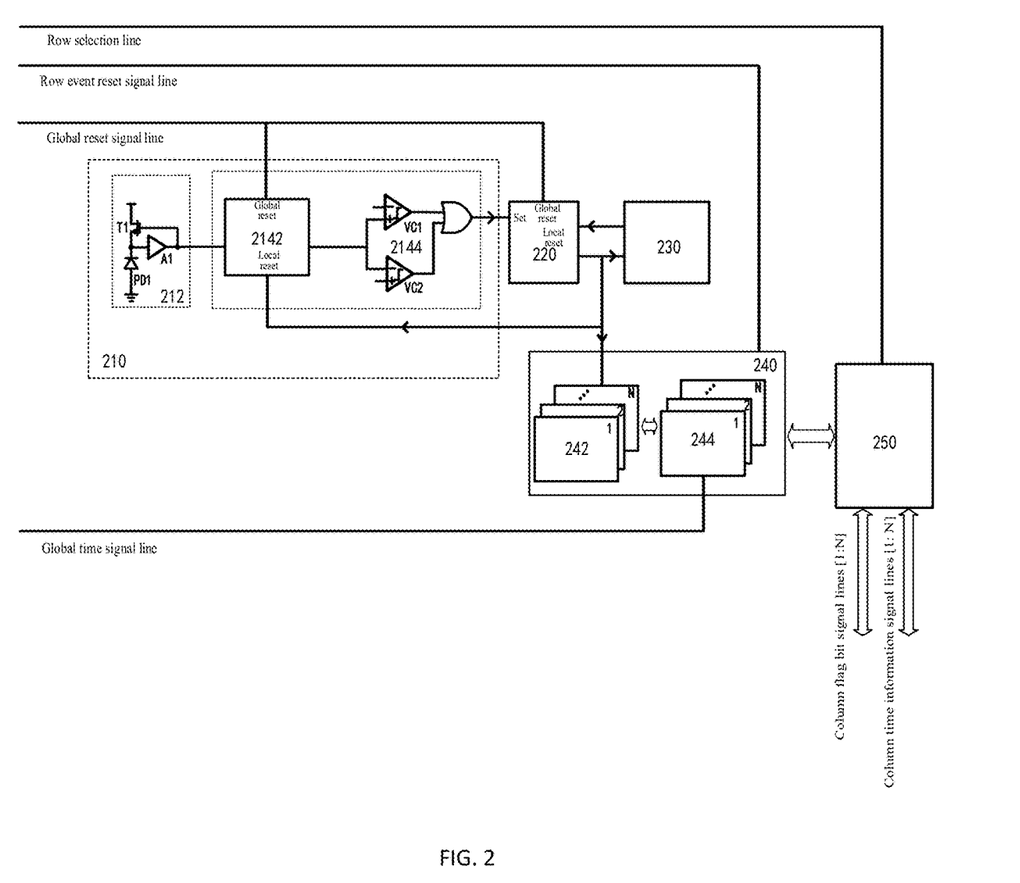
FIG. 2 shows a schematic diagram of a pixel collection circuit 200 according to some examples of the present disclosure.

FIG. 2 shows a schematic diagram of a pixel collection circuit 200 according to an example of the present disclosure. The pixel collection circuit 200 at least includes: an event generation module 210, a state latch 220, a self-timing logic 230, an event sequence storage module 240 and a reading module 250. Where the event generation module 210 is coupled with the state latch 220, meanwhile, the state latch 220 is coupled with the self-timing logic 230, the state latch 220 is also coupled with the event sequence storage module 240, which is coupled to the reading module 250.

The event generation module 210 generates a trigger signal that represents event generation when the intensity change (such as illuminance variation and change rate) of light irradiated on it meets a certain condition (such as both illuminance variation and change rate exceeding their respective thresholds), and sends the trigger signal to the coupled state latch 220 to set the state latch 220.

In an example, the event generation module 210 includes a photoelectric detection sub-module 212 and a trigger generation sub-module 214 which are coupled with each other. The trigger generation sub-module 214 further includes: a high-pass filter amplifier 2142 and a threshold comparison sub-module 2144.

The photoelectric detection sub-module 212 monitors an optical signal emitted to the sub-module in real time and outputs a corresponding electrical signal.

The trigger generation sub-module 214 generates a trigger signal that represents event generation when the electrical signal meets a threshold condition. Specifically, the high-pass filter amplifier 2142 is coupled with the photoelectric detection sub-module 212 to conduct preprocessing operation on the electrical signal to generate a processed electrical signal, where the preprocessing operation includes at least one of amplification operation and filtering operation. The threshold comparison sub-module 2144 determines whether the processed electrical signal meets the threshold condition (such as being greater than a first threshold, less than a second threshold, but not limited to this), and generates the trigger signal when the threshold condition is met. According to an implementation of the present disclosure, the amplification operation in the preprocessing operation is to increase the sensitivity of the pixel collection circuit to light intensity detection, but this is not necessary. The filtering operation is generally high-pass filtering, which only responds to high-frequency light intensity changes that are fast enough to filter out slow light intensity changes.

FIG. 2 illustrates an implementation of each part in the event generation module 210. The photoelectric detection sub-module 212, for example, is a logarithmic photoelectric detector. The high-pass filter amplifier 2142 may adopt various well-known filtering and amplification techniques, and the threshold comparison sub-module 2144 may be implemented through a voltage comparator, but none of them are limited to this. Since the function of the event generation module 210 is not different from that of the general dynamic vision sensor, it will not be repeated here.

The state latch 220 is set when receiving the trigger signal, and the pixel collection circuit 200 enters the trigger state. Meanwhile, the state latch 220 sends signals to the self-timing logic 230 and the event sequence storage module 240, respectively.

On the one hand, the self-timing logic 230 is activated when the state latch 220 is set, and after a predetermined period of time in the activated state, it automatically resets the state latch 220 (i.e. local reset in FIG. 2), so that the pixel collection circuit 200 is enabled to automatically release the trigger state. As shown in FIG. 2, the state latch 220 sends a signal to the high-pass filter amplifier 2142 after being reset in order to reset the high-pass filter amplifier 2142. In this way, the event generation module 210 may once again respond to the external light intensity change.

According to an example of the present disclosure, the predetermined period of time (i.e., self-determined time) is generally in the microsecond range, as long as the pixel collection circuit 200 may be stably reset. Through cooperation of the self-timing logic 230 with the state latch 220, the pixel collection circuit 200 may continuously detect the external light intensity change. In other words, during a single collection process, the pixel collection circuit 200 may be triggered repeatedly to generate a plurality of events.

For the general dynamic vision sensor, the triggered pixel collection circuit is only selected by the peripheral reading unit after a certain time of reading delay, then the handshake protocol control logic of the pixel collection circuit will reset the state latch, the trigger state of the pixel collection circuit is released and the pixel collection circuit responds to the external light intensity change again. Limited by the event processing and reading speed of the image sensor, the reading delay is generally in the range of several hundred microseconds or even milliseconds, when there is more dynamic information in the field of view, the reading delay may become longer due to the blockage of a large number of events. During this period, the pixel collection circuit is not supposed to respond to the external light intensity change. Even if the light intensity change meets the certain condition mentioned above, no new events are supposed to be generated, resulting in the loss of some event information in the general dynamic vision sensor. In contrast, according to the pixel collection circuit 200 in an example of the present disclosure, the original handshake protocol control logic is replaced by the self-timing logic, ensuring that the pixel collection circuit 200 may continuously detect and generate events.

On the other hand, whenever the state latch 220 is set, the event sequence storage module 240 stores the event information of the generated event. The event sequence is composed of at least one event (usually a plurality of events), and the event sequence storage module 240 stores the event information of the event sequence. When the peripheral reading unit selects the pixel collection circuit, it reads all the event information of the stored event sequence at once.

In an example, the event information includes state information and time information of the event. The state information indicates whether the event is a triggered event, and the time information records the time when the event is triggered.

According to an example, the event sequence storage module 240 includes an event register group 242 and a time sampling group 244. Where the event register group 242 includes a plurality of event registers (optionally, the number of the event registers is set to N, N>1), and one event register stores the state information of an event generated by the pixel collection circuit 200.

The time sampling group 244 includes a plurality of sampling sub-modules, the sampling sub-modules are in one-to-one correspondence with the event registers (i.e., the number of the sampling sub-modules is also N), and the sampling sub-modules are used to record the time information of the event pointed to by the corresponding event registers. In an example, the sampling sub-modules are coupled with a peripheral global time signal generation unit 130 through a global time signal line, and sample instantaneous amplitude of a global time signal at the time of event generation as the time information of the event.

According to the example shown in FIG. 2, the reading module 250 is implemented as a parallel reading module, and the reading module 250 is coupled with a peripheral reading unit 140 through one row selection line, a plurality of column flag bit signal lines and a plurality of column time information signal lines. In an example, the number of the column flag bit signal lines and the number of the column time information signal lines may be consistent with the number of the event registers (the sampling sub-modules), that is, both are N. As shown in FIG. 2, a plurality of column flag bit signal lines and a plurality of column time information signal lines are respectively referred to as column flag bit signal lines [1:N] and column time information signal lines [1:N].

When the row where the pixel collection circuit 200 is located is selected by the row selection sub-unit 142, the row selection line is valid, and the reading module 250 reads the event information stored in the event sequence storage module 240. Specifically, the reading module 250 outputs state information of each event through the column flag bit signal lines [1:N] and outputs time information of each event through the column time information signal lines [1:N].

Figure 3:
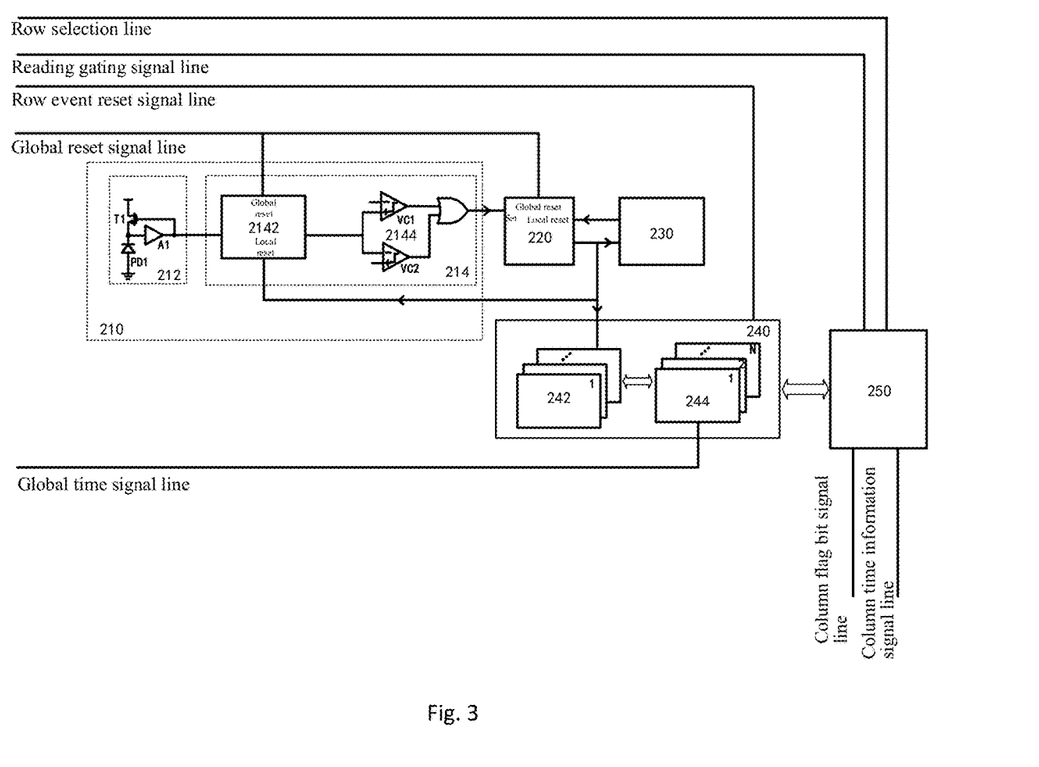
FIG. 3 shows a schematic diagram of a pixel collection circuit 200 according to some other examples of the present disclosure.

FIG. 3 shows a schematic diagram of a pixel collection circuit 200 according to some other examples of the present disclosure. Compared with the pixel collection circuit 200 shown in FIG. 2, the pixel collection circuit 200 in FIG. 3 adopts a serial mode to implement the reading module 250 (i.e., the serial reading module). Specifically, compared with the parallel reading module, the serial reading module is added with reading gating signal lines in the row direction, and is only provided with one column flag bit signal line and one column time information signal line in the column direction.

Since the event generation module 210, the state latch 220, the self-timing logic 230 and the event sequence storage module 240 have been explained one by one in the relevant content of FIG. 2 above, only the reading module 250 is described here.

In the example shown in FIG. 3, the reading module 250 is coupled with the peripheral reading unit 140 through the row selection line, the reading gating signal line, the column flag bit signal line and the column time information signal line.

When the row where the pixel collection circuit 200 is located is selected by the row selection sub-unit 142, the row selection line is valid, and the reading module 250, under the action of the reading gating signal line, serially outputs the state information of the event sequence through the column flag bit signal line, and serially outputs the time information of the event sequence through the column time information signal line.

It should be pointed out that FIGS. 2 and 3 above are only examples, showing a schematic diagram of the pixel collection circuit 200 according to an embodiment of the present disclosure. But the present disclosure is not limited to this.

Figure 4A:
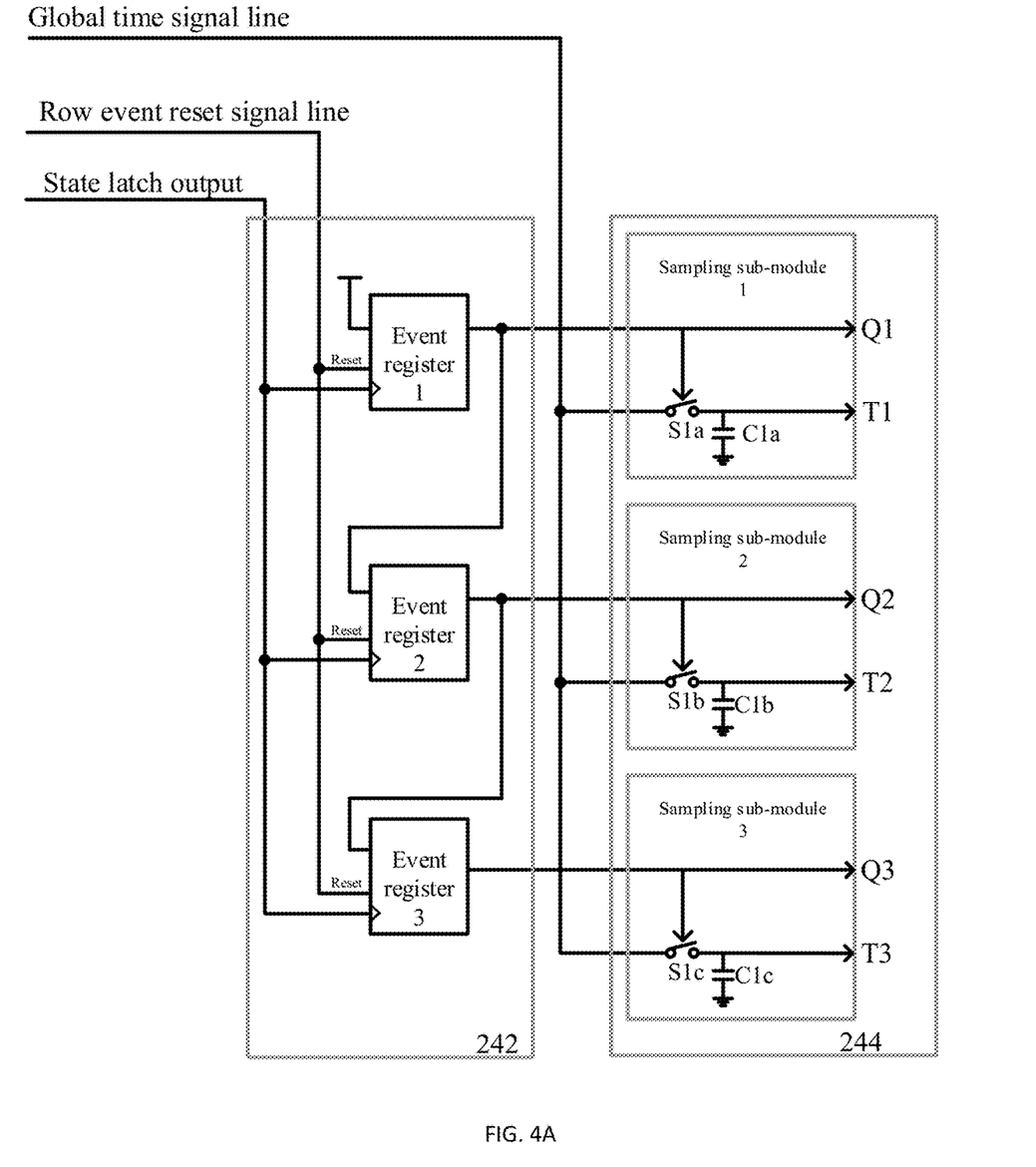
FIGS. 4A and 4B show a schematic diagram of an event sequence storage module 240 respectively according to some examples of the present disclosure.
Figure 4B:
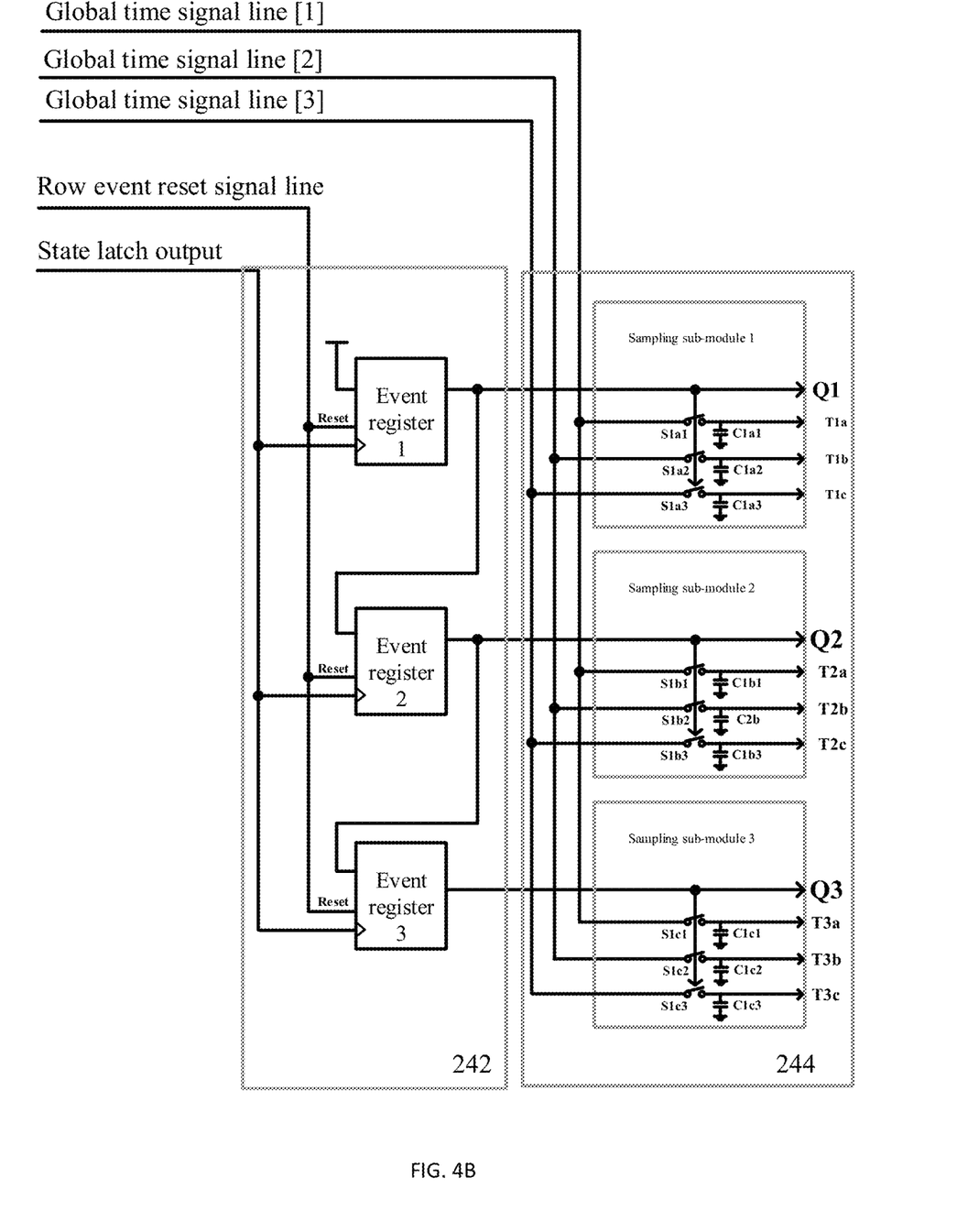

Furthermore, FIGS. 4A and 4B show a schematic diagram of an event sequence storage module 240 respectively according to some examples of the present disclosure.

In the event sequence storage module 240 shown in FIGS. 4A and 4B, the value of N is taken as 3. That is, the event register group 242 includes 3 event registers and 3 sampling sub-modules, and each event register corresponds to one sampling sub-module. As mentioned above, each event register stores the state information of one event, and each sampling sub-module stores the time information of an event.

For the example shown in FIG. 4A, the global time signal line provides a periodically changed analog voltage signal, such as a ramp signal, a triangular wave signal, or an exponential signal.

The event register group 242 includes N event registers connected in series, as mentioned above, usually N≥2. The input end of the first event register (i.e., event register 1 in FIG. 4A) is connected to the power supply voltage, and the input ends of the 2nd to Nth event registers are connected to the output ends of the previous event registers, i.e., a register chain is formed by these N event registers. In addition, the clock signal of each event register is the output of the state latch 220, and all the event registers are connected to a row event reset signal line, which provides a reset signal.

The N sampling sub-modules in the time sampling group 244 are independent of each other, are only coupled with their corresponding event registers, and have the same structure. In the example shown in FIG. 4A, the sampling sub-module is an analog sampling module, including one first switch S1 and one first capacitor C1. Where the control end of the first switch S1 is connected to the output end of the corresponding event register, the first end of the first switch S1 is connected to the global time signal line, the second end of the first switch S1 is connected to the first end of a first capacitor C1, and the second end of the first capacitor C1 is grounded.

The case of N=3 is shown in FIG. 4A, but is not limited to this. Below, the event sequence storage module 240 is further explained in terms of N=3. As shown in FIG. 4A, the output of the event register 1 is connected to the input of the event register 2, the output of the event register 2 is connected to the input of the event register 3, and the input of the event register 1 is connected to the power supply voltage.

When the row event reset signal is valid, all the event registers are reset to represent that there are no events generated in the pixel collection circuit. The event register 1 and the sampling sub-module 1 are taken as examples for explanation. The sampling sub-module 1 consists of the first switch S1$a$ and the first capacitor C1$a$. The control signal of the first switch S1$a$ is the output signal Q1 of the event register 1. When the event register 1 is reset, the output signal Q1 thereof is low level. At this time, the first switch S1$a$ is closed, and the first capacitor C1$a$ follows the global time signal provided by the global time signal line. When one event is generated, the event register 1 is set, and the output signal Q1 thereof becomes high level. The first switch S1$a$ is off, and the first capacitor C1$a$ samples the instantaneous amplitude information of the global time signal at the time when the first switch S1$a$ is off, as the time information of the event.

In this way, the output signals Q1, Q2 and Q3 of the three event registers indicate the state information of the event sequence in the pixel collection circuit 200, and the output signals T1, T2 and T3 of the three sampling sub-modules indicate the time information of the event sequence in the pixel collection circuit 200.

For the example shown in FIG. 4B, the global time signal line provides an encoded periodic digital signal, such as a multi-bit Gray Code signal. The sampling sub-modules are still analog sampling modules, and certainly, digital storage modules such as latches may also be used, without any restrictions here.

In FIG. 4B, the global time signal lines [1:3] transmit 3-digit digital signals. Certainly, this is only an example, and the examples of the present disclosure are not limited to this. Correspondingly, each sampling sub-module also contains three sub-units to achieve separate sampling of these 3-digit digital signals. Specifically, each sub-module contains a first switch S1 and a first capacitor C1, whose connection mode may refer to the previous description of FIG. 4A. The same content as FIG. 4A will not be elaborated here.

Taking the sampling sub-module 1 as an example, the first switch S1$a$1 and the first capacitor C1$a$1 form a first sub-module, which is connected to the global time signal line [1] and outputs the signal T1$a$; the first switch S1$a$2 and the first capacitor C1$a$2 form a second sub-module, which is connected to the global time signal line [2] and outputs the signal T1$b$; the first switch S1$a$3 and the first capacitor C1$a$3 form a third sub-module, which is connected to the global time signal line [3] and outputs the signal T1$c$. Afterwards, T1$a$, the time information of the first event is obtained by combining T1$b$ and T1$c$. Based on similar structure and connection relation, the sampling sub-module 2 and the sampling sub-module 3 respectively sample and output the time information of the second event and the time information of the third event.

Based on the descriptions in FIGS. 4A and 4B, those skilled in the art should understand that the event sequence storage module 240 (especially the time sampling group 244) may be adjusted according to the global time signal provided by the global time signal generation unit 130, so as to achieve the pixel collection circuit 200 according to an example of the present disclosure.

Figure 5:
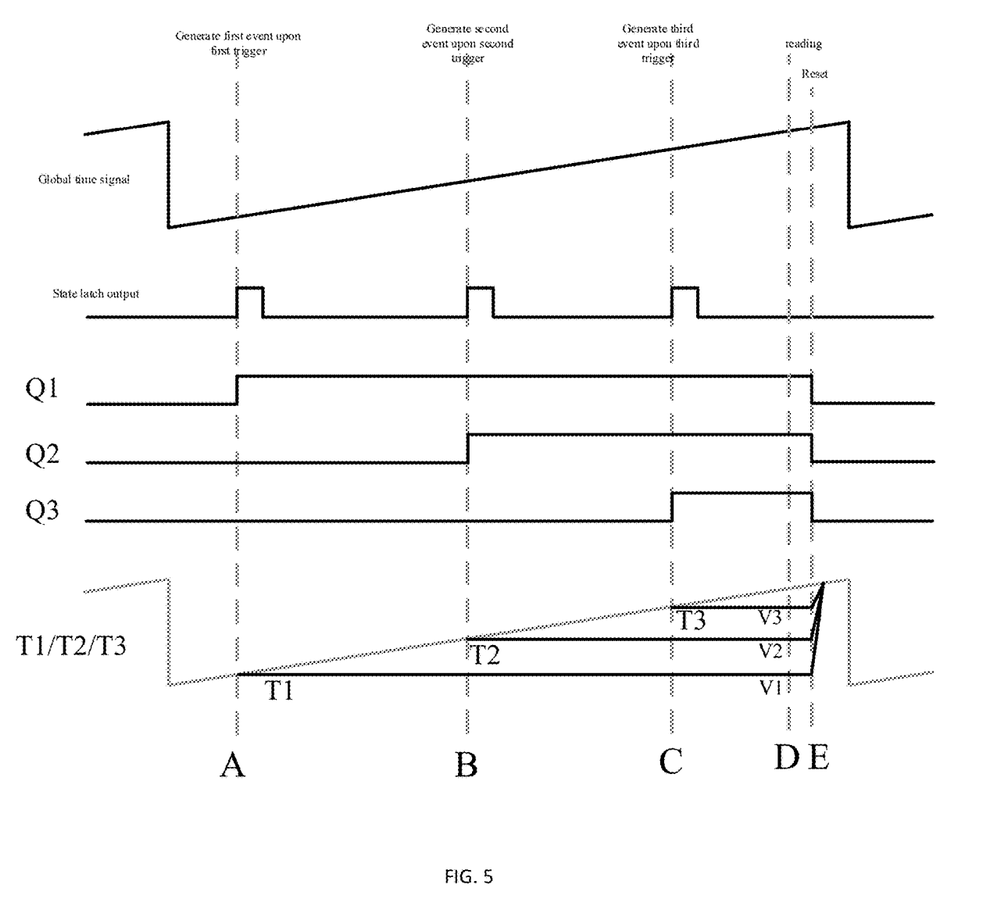
FIG. 5 shows an output signal sequence diagram of a state latch 220 and an event sequence storage module 240 according to an example of the present disclosure.

The workflow of the event sequence storage module 240 is further illustrated below in conjunction with FIG. 5. FIG. 5 shows an output signal sequence diagram of a state latch 220 and an event sequence storage module 240 according to an example of the present disclosure (i.e., the example shown in FIG. 4A). Here, the global time signal is a ramp voltage signal.

At the beginning, all the three event registers are reset, and their corresponding output signals Q1, Q2 and Q3 are all 0, indicating that the pixel collection circuit does not generate any event. The first switches in all the three sampling sub-modules are all closed, and their corresponding output signals T1, T2 and T3 follow the global time signal.

At time A, the pixel collection circuit triggers and generates the first event, the output of the state latch becomes high level at the moment, the event register 1 is set, and the output signal Q1 thereof becomes 1. In the sampling sub-module 1, the first switch is off, and the instantaneous voltage amplitude V1 of the global time signal at the moment is sampled by the first capacitor as the time information of the first event. After the state latch is set, the self-timing logic in the pixel collection circuit is activated, and automatically resets the state latch after the timing ends. Therefore, the output of the state latch is a pulse signal. After the state latch is reset, the pixel collection circuit continues to detect the external light intensity change.

At time B, the pixel collection circuit triggers again and generates the second event, and the output of the state latch becomes high level again. Since the event register 1 has been set, the output signal Q2 of the event register 2 becomes high level, indicating that the pixel collection circuit has detected two events. The first switch in the sampling sub-module 2 is off, and the instantaneous voltage amplitude V2 of the global time signal at the moment is sampled by the first capacitor as the time information of the second event. Subsequently, the self-timing logic is activated, the state latch is reset after the timing ends, and the pixel collection circuit continues to detect the external light intensity change.

At time C, the pixel collection circuit detects the third event, Q3 becomes high level, the first switch in the sampling sub-module 3 is off, and the first capacitor samples the instantaneous voltage amplitude V3 of the global time signal at the moment as the time information of the third event.

At time D, the row selection sub-unit selects the row, the row selection line is valid, the reading module in the pixel collection circuit (which may be a parallel reading module or a serial reading module) sends the state information Q1, Q2 and Q3 of the event sequence output by the event sequence storage module to a column selection sub-unit through the column flag bit signal line, and sends the time information T1, T2 and T3 of the event sequence to the column selection sub-unit through the column time information signal line. A column flag bit reading sub-unit in the column selection sub-unit reads Q1, Q2 and Q3. In this example, since they are all 1, the pixel collection circuit generates three events; a column time information reading sub-unit in the column selection sub-unit obtains the time information corresponding to the three events, and converts the instantaneous amplitudes V1, V2 and V3 of the global time signal stored in each sampling sub-module into digital digits for encoded output. Due to the one-to-one correspondence between the voltage amplitude of the ramp voltage and time, a back-end processing unit may recover the true trigger time information of each event based on this. After the event information stored in the pixel collection circuit is read, the row selection sub-unit sets the row event reset signal to be valid. At this time, all the event registers are reset, the switches in the sampling sub-modules are closed again, and all event information previously stored in the pixel collection circuit is cleared to zero. Afterwards, the workflow of the pixel collection circuit is consistent with the above description.

Figure 6:
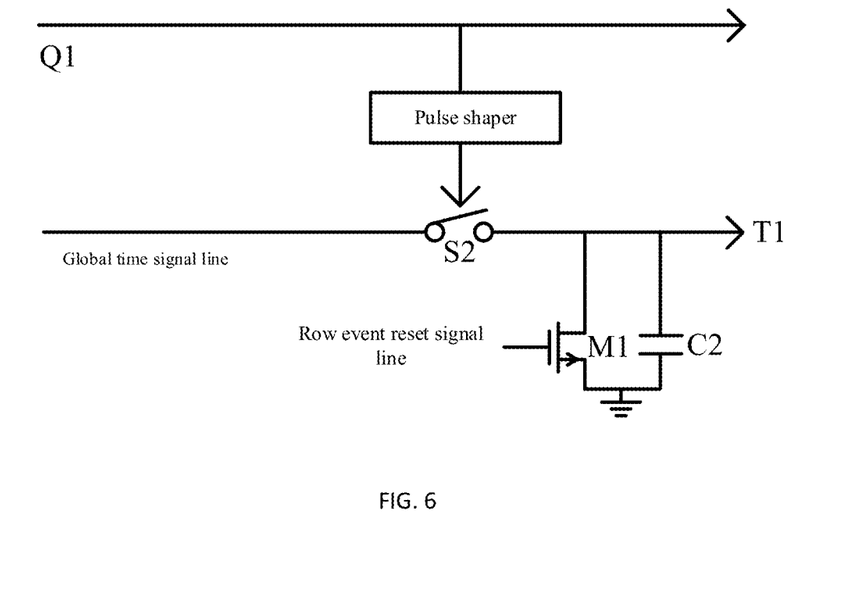
FIG. 6 shows a schematic diagram of a sampling sub-module according to another example of the present disclosure.

According to other examples, the sampling sub-module in the event sequence storage module 240 may also be implemented in other ways. FIG. 6 shows a schematic diagram of a sampling sub-module according to another example of the present disclosure. In some embodiments, the sampling sub-module shown in FIG. 6 may be used to replace the sampling sub-module in FIG. 4A or FIG. 4B to form a new event sequence storage module. The sampling sub-module 1 is taken as an example for explanation. This sampling sub-module 1 is connected to the event register 1, while other sampling sub-modules are connected to other event registers sequentially with the same method.

As shown in FIG. 6, the sampling sub-module includes not only the second switch S2 and the second capacitor C2, but also a pulse shaper and a first transistor M1. Where the control end of the second switch S2 is connected to the output end of the corresponding event register through the pulse shaper (i.e., the control signal of the second switch S2 is the signal of Q1 processed by the pulse shaper), the first end of the second switch S2 is connected to the global time signal line, and the second end is respectively connected to the drain of the first transistor M1 and the first end of the second capacitor C2. The first transistor M1 and the second capacitor C2 are connected in parallel, where the source of the first transistor M1 and the second end of the second capacitor C2 are grounded, and the grid of the first transistor M1 is connected to the row event reset signal line.

When the row event reset signal is valid, the first transistor M1 is turned on, and the second capacitor C2 is discharged to the ground potential, that is, T1 is initialized to the ground potential. When the pixel collection circuit generates an event, Q1 becomes high level, and the sampling sub-module outputs a narrow pulse signal to the second switch S2 through the pulse shaper. During this period, the second switch S2 is closed, and the instantaneous amplitude of the global time signal is sampled by the second capacitor C2 as the time information of the event.

Compared to the sampling sub-modules shown in FIGS. 4A and 4B, in the sampling sub-module shown in FIG. 6, for an untriggered event register, the second switch S2 remains in an off state and T1 remains at the ground potential. Therefore, an external processing module may also indirectly determine the state information of the event (i.e., if T1 is a ground potential, it indicates that the event state is untriggered; otherwise, if T1 is not a ground potential, it indicates that the event state is triggered) by the aid of the amplitude information of T1, without having to output the state information of the event stored in the event register through the column flag bit signal line.

Figure 7A:
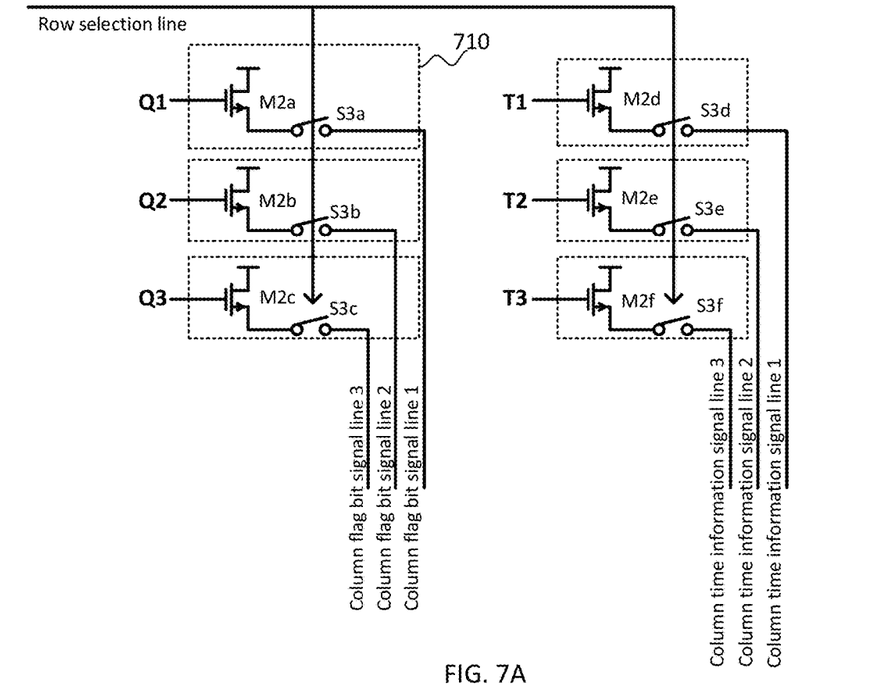
FIG. 7A shows a schematic diagram of a reading module 250 according to an example of the present disclosure.
Figure 7B:
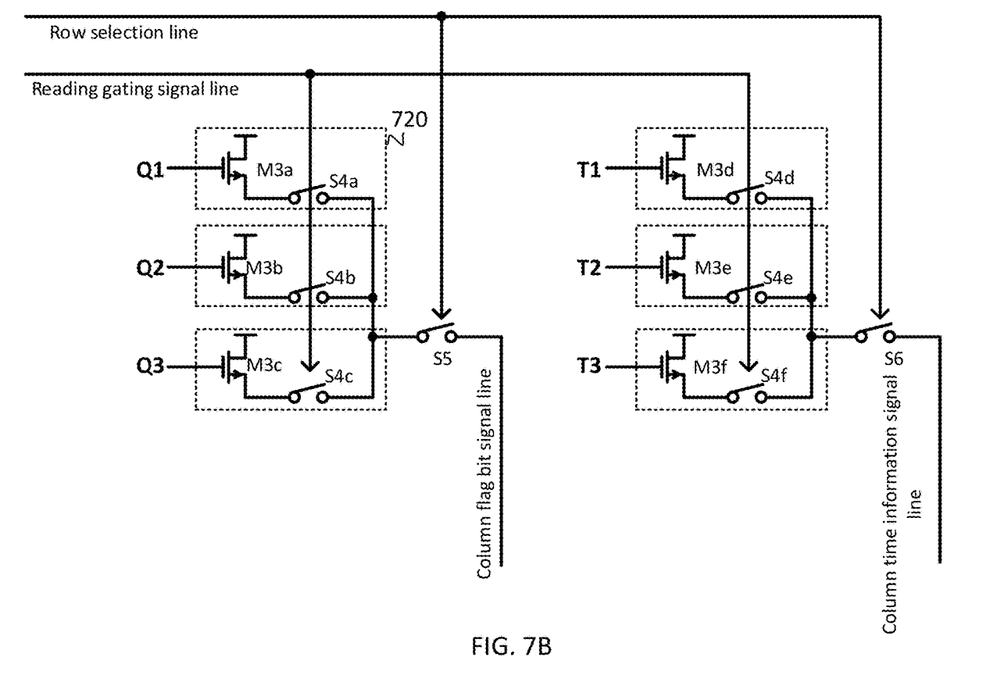
FIG. 7B shows a schematic diagram of a reading module 250 according to another example of the present disclosure.

FIG. 7A shows a schematic diagram of a reading module 250 according to an example of the present disclosure, and FIG. 7B shows a schematic diagram of a reading module 250 according to another example of the present disclosure.

Referring to the relevant descriptions in FIGS. 2 and 3 above, the reading module 250 may be implemented as a parallel reading module or a serial reading module. Where FIG. 7A shows the parallel reading module, and FIG. 7B shows the serial reading module.

In the parallel reading module as shown in FIG. 7A, the reading module 250 includes: a plurality of buffer sub-modules each of which composed of a second transistor M2 and a third switch S3 connected in series, and each buffer sub-module outputs state information or time information of an event correspondingly. For ease of understanding, N=3 is still taken for the case in FIG. 7A. That is, three event registers output Q1, Q2 and Q3 respectively, and three sampling sub-modules output T1, T2, and T3 respectively. In this way, there are a total of 6 buffer sub-modules (highlighted by dashed lines in FIG. 7A), corresponding to the event registers and the sampling sub-modules respectively.

Taking one of the buffer sub-modules 710 as an example, the source of the second transistor M2a is connected to one end of the third switch S3a, the grid of the second transistor M2a is connected to the output end of the event sequence storage module (i.e. Q1), and the drain of the second transistor M2a is connected to the power supply. In addition, the control end of the third switch S3a is connected to a row selection line (therefore, the third switch is also known as a row selection switch), and the other end of the third switch S3a is connected to a column flag bit signal line or a column time information signal line. Other buffer modules may refer to the buffer sub-module 710. Due to space limitations, they will not be elaborated here.

The state information Q1, Q2 and Q3, as well as time information T1, T2 and T3 of the event output by the event sequence storage module are sent to the corresponding column flag bit signal line and column time information signal line through the buffer sub-modules. When the row is selected, the row selection line is valid, all row selection switches are turned on, and Q1, Q2, Q3, T1, T2 and T3 are correspondingly sent to the column flag bit signal lines [1:3] and the column time signal lines [1:3].

In the serial reading module as shown in FIG. 7B, the reading module 250 includes: a plurality of buffer sub-modules each of which composed of a third transistor M3 and a fourth switch S4 connected in series, as well as a fifth switch S5 and a sixth switch S6. As mentioned earlier, the number of the buffer sub-modules is consistent with the total number of the event registers and sampling sub-modules. Similarly, N=3 is still taken for the case in FIG. 7B, there are a total of 6 buffer sub-modules (similarly, highlighted by dashed lines in FIG. 7B).

Taking one buffer sub-module 720 connected to the event register as an example, the source of the third transistor M3a is connected to one end of a fourth switch S4a, the grid of the third transistor M3a is connected to the output end of the event sequence storage module (i.e. Q1), and the drain of the third transistor M3a is connected to the power supply. Meanwhile, the control end of the fourth switch S4a is connected to the reading gating signal line, and the other end of the fourth switch S4a is connected to one end of a fifth switch S5. One end of the fifth switch S5 is connected to the other ends of one part of the fourth switches S4 (one part of the fourth switches refers to all the fourth switches of the buffer sub-module connected to the event register), and the other end is connected to the column flag bit signal line.

Similarly, for the buffer sub-module connected to the sampling sub-module, the other ends of the fourth switches S4 are connected to the end of the sixth switch S6. Compared to the fifth switch S5, one end of the sixth switch S6 is connected to the other ends of the other part of the fourth switches S4 ("the part of the fourth switches" refers to all the fourth switches of the buffer sub-module connected to the sampling sub-module), and the other end is connected to the column time information signal line.

The fourth switches S4a to S4f in the buffer sub-module are controlled by the reading gating signal line, while the fifth switch S5 and the sixth switch S6 are controlled by the row selection line. The outputs of Q1, Q2 and Q3 share one column flag bit signal line, while the outputs of T1, T2 and T3 share one column time information signal line. When the row is selected, the row selection line is valid, and the fifth switch S5 and the sixth switch S6 are both closed. At this time, the reading gating signal line sequentially controls the fourth switches S4a, S4b and S4c to be turned on successively, and the state information Q1, Q2 and Q3 of the event is output serially through the column flag bit signal line. Similarly, the reading gating signal line sequentially controls the fourth switch S4d, S4e and S4f to be turned on successively, and the time information T1, T2 and T3 of the event is serially output through the column time signal line.

To sum up, according to the pixel collection circuit of the present disclosure, the self-timing logic is used instead of a handshake protocol control logic in general dynamic vision sensor. After the pixel collection circuit 200 enters the trigger state, the self-timing logic is activated and automatically releases the trigger state of the pixel collection circuit after the timing ends, and the pixel collection circuit may immediately respond to an external light intensity change. In this way, the operation of the pixel collection circuit no longer relies on a peripheral reading control logic, and may continuously detect and generate events. In addition, an event sequence storage module is further added to the pixel collection circuit to temporarily store state information and time information of a plurality of events generated by the pixel collection circuit. When the pixel collection circuit is selected by a peripheral reading unit, event sequence information temporarily stored in the pixel collection circuit is read to an external unit.

By the above method, the image sensor 100 of the present disclosure is not supposed to miss event detection due to reading delay. In addition, due to insensitivity to reading delay, the working speed of the reading unit on the periphery of the pixel collection circuit array may also be correspondingly reduced, thereby further reducing the power consumption of the image sensor.

In the description provided herein, numerous specific details are set forth. However, it can be understood that the examples of the present disclosure may be implemented without these specific details. In some instances, well-known methods, structures and technologies are not shown in detail, such that understanding of the description is not obscured.

Similarly, it should be understood that in the above description of the illustrative examples of the present disclosure, various features of the present disclosure are sometimes grouped together into a single example, figure, or description thereof, in order to simplify the present disclosure and facilitate understanding of one or more aspects of the present disclosure. However, the disclosed method should not be interpreted as reflecting the following intention that the claimed invention requires more features than those explicitly recited in each claim. More specifically, as reflected in the following claims, the aspect of the present disclosure has less features than all features of the single example disclosed above. Therefore, the claims following a specific embodiment are hereby expressly incorporated into the specific embodiment, where each claim serves as a separate example of the present disclosure.

Those skilled in the art should understand that modules or units or assemblies of devices in the examples disclosed herein may be arranged in the devices as described in the example, and alternatively may be located in one or more devices different from the devices in the example. The modules in the above-mentioned examples may be combined into a module, or in addition may be divided into a plurality of sub-modules.

Those skilled in the art may understand that the modules in the device in the example may be adaptively changed and arranged in one or more devices different from the example.

The modules or units or assemblies in the example may be combined into one module or unit or assembly, and in addition, may be divided into a plurality of sub-modules or sub-units or sub-assemblies. Except that at least part of such features and/or processes or units are mutually exclusive, all features disclosed in the description (including appended claims, abstract and drawings) and all processes or units of any method or device so disclosed may be combined in any combination. Unless explicitly stated otherwise, each feature disclosed in the description (including the appended claims, abstract and drawings) may be replaced with alternative features that serve the same, equivalent or similar objectives.

In addition, those skilled in the art can understand that although some examples described herein include some features but not other features included in the other examples, combinations of the features of different examples mean being within the scope of the present disclosure and forms different examples. For instance, in the following claims, any one of the claimed examples may be used in any combination.

In addition, some examples are described herein as methods or combinations of method elements that may be implemented by a processor of a computer system or by other apparatuses executing the described functions. Accordingly, a processor having a necessary instruction configured to implement the method or method element forms an apparatus configured to implement the method or method element. In addition, the elements described herein of the apparatus example are instances of the apparatus configured to implement the functions executed by the elements for the objective of implementing the present disclosure.

As used herein, unless otherwise specified, ordinal numerals such as "first", "second" and "third" are used to describe a common object so as to only indicate different instances involving similar objects, without intention to imply that the objects thus described have to have a given order in terms of time, space, ordering or in any other way.

Although the present disclosure is described in terms of a limited number of examples, those skilled in the art may understand that other examples may be envisaged within the scope of the present disclosure thus described, having the benefit of the above description. In addition, it should be noted that the language used in the description is mainly selected for readability and teaching objectives, instead of explaining or defining the subject matter of the present disclosure. Therefore, without departing from the scope and spirit of the appended claims, many modifications and changes will be obvious to those of ordinary skill in the art. The disclosure of the present disclosure is illustrative rather than restrictive with respect to its scope, and the scope of the present disclosure is defined by the appended claims.

What is claimed is:

1. A pixel collection circuit, comprising:
  an event generation module suitable for generating a
    trigger signal that represents event generation when an intensity change of light illuminated on the event generation module meets a certain condition;
a state latch suitable for being set when the trigger signal is received;
a self-timing logic coupled to the state latch and suitable for being activated when the state latch is set and resetting the state latch after a predetermined period of time in the activated state so as to enable the event generation module to respond to an external light intensity change again;
an event sequence storage module coupled to the state latch and suitable for storing event information of an event sequence composed of a plurality of generated events when the state latch is set; and
a reading module coupled to the event sequence storage module and suitable for reading the event information of the event sequence stored in the event sequence storage module when a row selection line is valid.

2. The pixel collection circuit according to claim 1, wherein the event information comprises state information and time information of the generated events, and the event sequence storage module comprises:
an event register group containing a plurality of event registers which are suitable for storing state information of an event generated by the pixel collection circuit; and
a time sampling group containing a plurality of sampling sub-modules, wherein the sampling sub-modules are in one-to-one correspondence with the event registers, and the sampling sub-modules are suitable for recording the time information of the events pointed to by the corresponding event registers.

3. The pixel collection circuit according to claim 2, wherein
the reading module is coupled with a peripheral reading unit through the row selection line, a plurality of column flag bit signal lines and a plurality of column time information signal lines; and
the reading module is also suitable for outputting state information of each event through the plurality of column flag bit signal lines and outputting time information of each event through the plurality of column time information signal lines when the row selection line is valid.

4. The pixel collection circuit according to claim 2, wherein
the reading module is coupled with the peripheral reading unit through the row selection line, a reading gating signal line, the column flag bit signal lines and the column time information signal lines; and
the reading module is also suitable for outputting the state information of each event through the column flag bit signal lines and outputting the time information of each event through the column time information signal lines under the action of the reading gating signal line when the row selection line is valid.

5. The pixel collection circuit according to claim 2, wherein
the sampling sub-modules are coupled with a peripheral global time signal generation unit through a global time signal line, and suitable for sampling instantaneous amplitude of a global time signal at the time of event generation as the time information of the event.

6. The pixel collection circuit according to claim 2, wherein the event register group comprises:
N event registers connected in series, wherein N≥2, the input end of the first event register is connected to the power supply voltage, and the input ends of the 2nd to Nth event registers are connected to the output ends of the previous event registers, wherein
the clock signal of each event register is the output of the state latch, and all the event registers are connected to a row event reset signal line to be reset when receiving a row event reset signal.

7. The pixel collection circuit according to claim 6, wherein the sampling sub-module comprises:
a first switch, whose control end is connected to the output end of the corresponding event register, first end is connected to the global time signal line, and second end is connected to the first end of a first capacitor; and
the first capacitor, whose second end is grounded.

8. The pixel collection circuit according to claim 7, wherein
the event register is also suitable for indicating the state information of the corresponding event through the output signal thereof, wherein when the event register is reset, the output signal thereof is low level, and when the event register is set, the output signal thereof is high level; and
the sampling sub-module is also suitable for sampling the instantaneous amplitude of the global time signal through the first capacitor when the first switch is off as the time information of the corresponding event when the event register is set.

9. The pixel collection circuit according to claim 6, wherein the sampling sub-module comprises:
a pulse shaper;
a second switch, whose control end of is connected to the output end of the corresponding event register through the pulse shaper, first end is connected to the global time signal line, and second end is respectively connected to the drain of a first transistor and the first end of a second capacitor; and
the first transistor and the second capacitor connected in parallel, wherein the source of the first transistor and the second end of the second capacitor are grounded, and the grid of the first transistor is connected to the row event reset signal line.

10. The pixel collection circuit according to claim 9, wherein
the sampling sub-module is also suitable for outputting a narrow pulse signal to the second switch through the pulse shaper during event generation in order to turn off the second switch; the instantaneous amplitude of the global time signal is sampled by the second capacitor to serve as the time information of the event.

11. The pixel collection circuit according to claim 3, wherein the reading module comprises:
a plurality of buffer sub-modules each of which is composed of a second transistor and a third switch connected in series, and each buffer sub-module outputs state information or time information of an event correspondingly, wherein
the source of the second transistor is connected to one end of the third switch, the grid of the second transistor is connected to the output end of the event sequence storage module, the drain of the second transistor is connected to the power supply, the control end of the third switch is connected to the row selection line, and the other end of the third switch is connected to the column flag bit signal line or the column time information signal line.

12. The pixel collection circuit according to claim 4, wherein the reading module comprises:

a plurality of buffer sub-modules each of which is composed of a third transistor and a fourth switch connected in series, the source of the third transistor is connected to one end of the fourth switch, the grid of the third transistor is connected to the output end of the event sequence storage module, the drain of the third transistor is connected to the power supply, the control end of the fourth switch is connected to the reading gating signal line, and the other end of the fourth switch is connected to one end of a fifth switch or a sixth switch;

the fifth switch, one end of which is connected to the other ends of one part of the fourth switches, and the other end is connected to the column flag bit signal line; and the sixth switch, one end of which is connected to the other ends of the other part of the fourth switches, and the other end is connected to the column time information signal line.

13. The pixel collection circuit according to claim 1, wherein the event generation module comprises:

a photoelectric detection sub-module suitable for monitoring an optical signal emitted to the photoelectric detection module in real time and outputting a corresponding electrical signal; and a trigger generation sub-module coupled to the photoelectric detection sub-module and suitable for generating a trigger signal that represents event generation when the electrical signal meets a threshold condition.

14. An image sensor, comprising:

a pixel collection circuit array comprising a plurality of pixel collection circuits according to claim 1;

a global control unit coupled with the pixel collection circuit array through a global reset signal line and suitable for resetting the pixel collection circuit array when the image sensor is powered on;

a global time signal generation unit coupled with the pixel collection circuit array through a global time signal line and suitable for generating a global time signal that represents time information;

a reading unit coupled with the pixel collection circuit array through a row selection line, a row event reset signal line, a column flag bit signal line and a column time signal line and suitable for reading event information of an event sequence generated by the pixel collection circuit array.

15. The image sensor according to claim 14, wherein the reading unit comprises:

a row selection sub-unit coupled with the pixel collection circuit array through the row selection line and the row event reset signal line;

a column selection sub-unit coupled with the pixel collection circuit array through the column flag bit signal line and the column time signal line; and a reading control sub-unit suitable for controlling the row selection sub-unit and the column selection sub-unit.

16. The image sensor according to claim 15, wherein the event information comprises state information and time information of the event, and the column selection sub-unit comprises:

a column flag bit reading sub-unit suitable for reading the state information of the event through the column flag bit signal line; and a column time information reading sub-unit suitable for reading the time information of the event through the column time signal line.

* * * * *